UNITED STATES PATENT OFFICE.

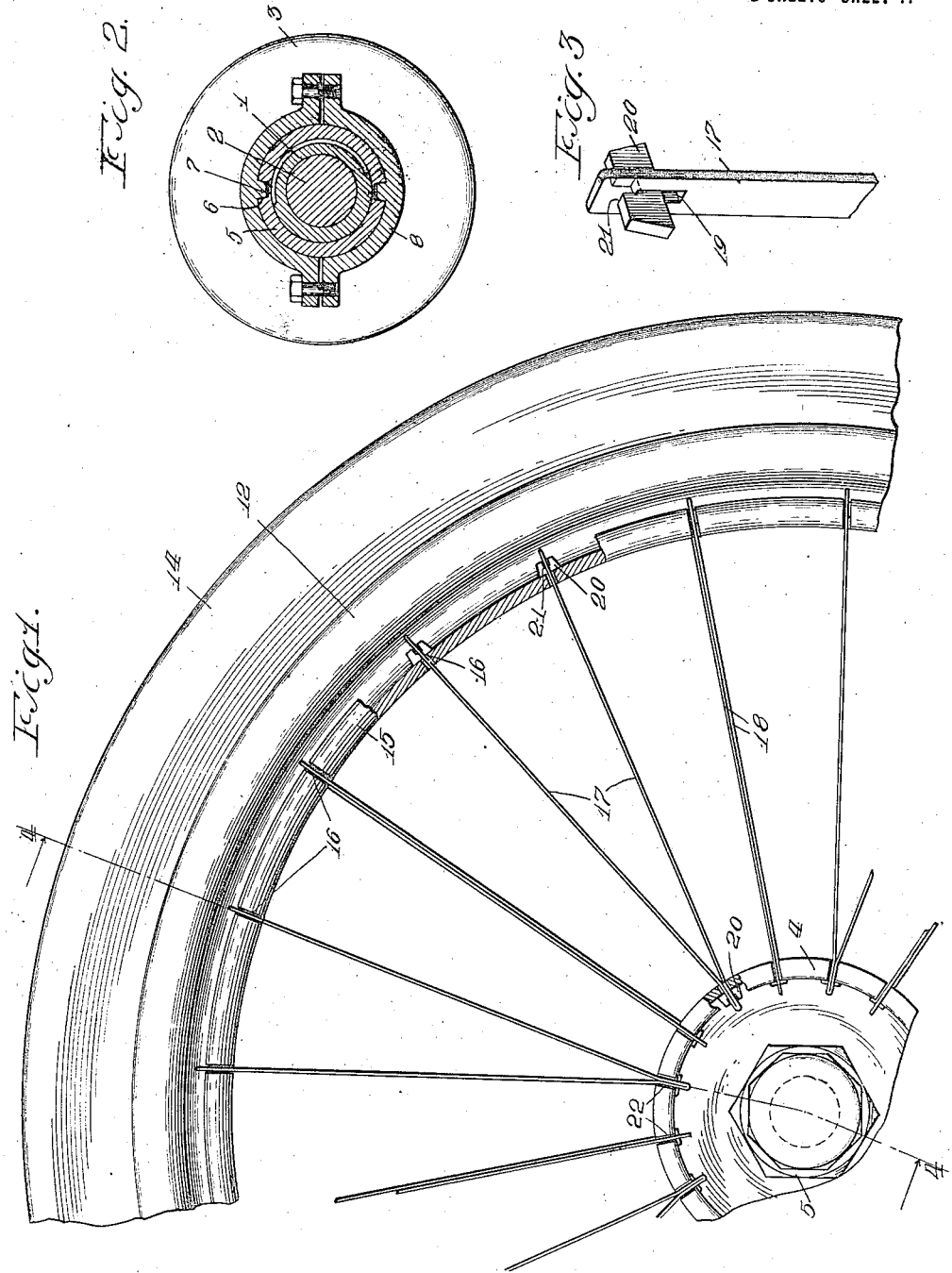
F. A. FROMMANN.
METALLIC SPOKED WHEEL.
APPLICATION FILED MAR. 3, 1913.
1,222,094.
Patented Apr. 10, 1917.
2 SHEETS—SHEET 1.
Witnesses:
R. L. Farrington
M. M. Boyle
Inventor
Franklin A. Frommann
By Lotz & Scheible Attys.

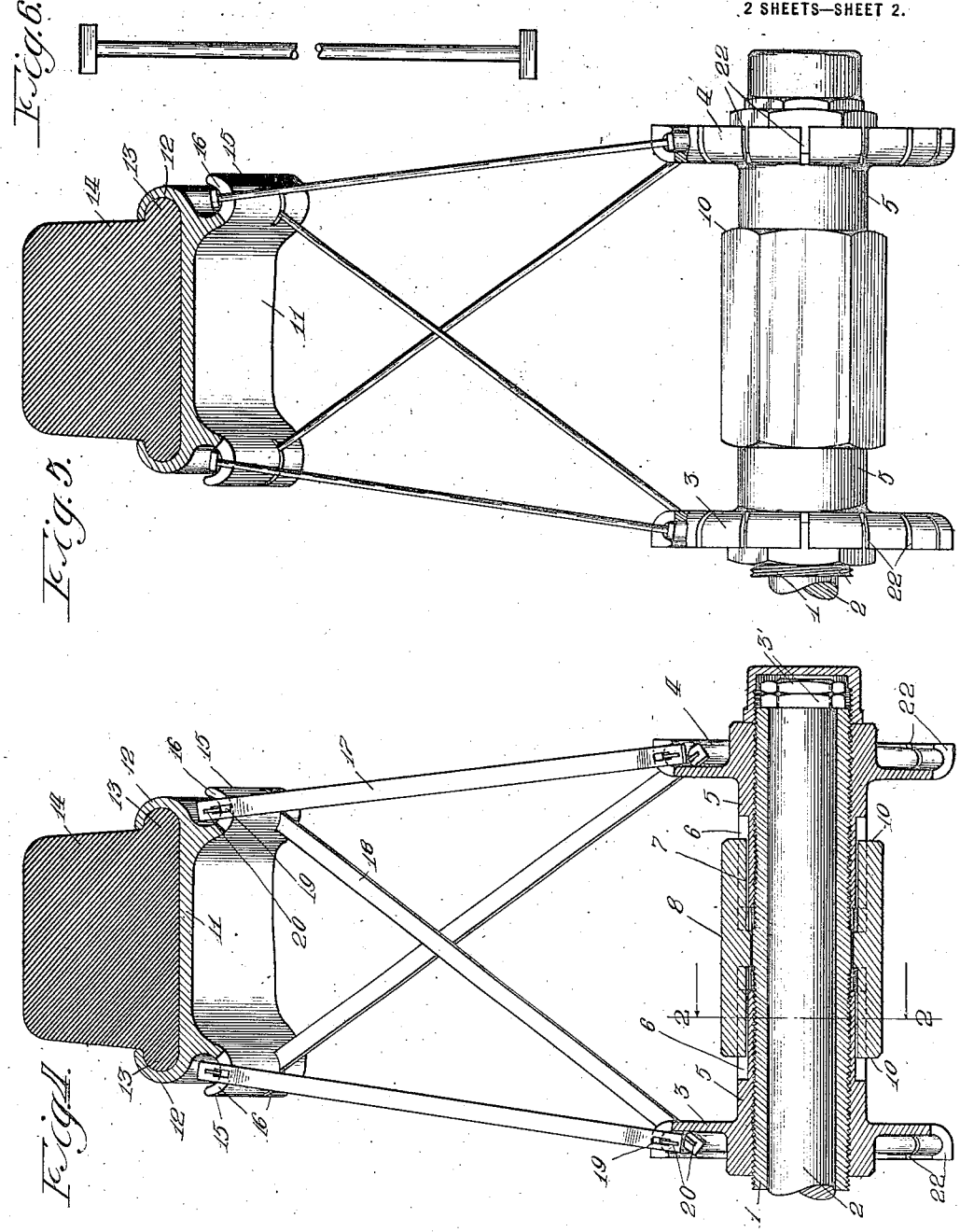

FRANKLIN A. FROMMANN, OF CHICAGO, ILLINOIS, ASSIGNOR TO OLIVE FROMMANN, OF CHICAGO, ILLINOIS.

METALLIC-SPOKED WHEEL.

1,222,094.   Specification of Letters Patent.   Patented Apr. 10, 1917.

Application filed March 3, 1913. Serial No. 751,883.

*To all whom it may concern:*

Be it known that I, FRANKLIN A. FROMMANN, a citizen of the United States, residing at Chicago, in the county of Cook and State of Illinois, have invented certain new and useful Improvements in Metallic-Spoked Wheels; and I do hereby declare the following to be a full, clear, and exact description of the invention, such as will enable others skilled in the art to which it appertains to make and use the same.

My invention relates to vehicle wheels and more particularly to the class of wheels used on light delivery vehicles or motor cycles. One object of my invention is to provide a wheel construction including separable spokes but requiring no threading upon either end of the said spokes. Another object is to provide means for simultaneously tightening all of the spokes of the wheel. A further object is to provide a wheel equipped with a smaller number of spoke-fastenings at the hub than at the rim, and to provide spoke formations adapted to connect a plurality of points upon the rim of a wheel with a single portion of the hub thereof. In the drawings, Figure —1— is a fragmentary side elevation, partially in section, of a wheel equipped with the spoke, rim and hub formation of my invention.

Fig. —2— is a transverse section through the hub of the wheel along the line 2—2 of Fig. —4—.

Fig. —3— is an enlarged view of an end portion of one of the spokes and of the locking member used for interlocking the end of the spoke with either the hub or the rim member of the wheel.

Fig. —4— is a fragmentary section of the wheel along the line 4—4 of Fig. —1—.

Fig. —5— is a view similar to Fig. —4— but with the hub member in elevation and with an alternate form of spoke used thereon.

Fig. —6— is an elevation of one of the spokes used in the construction shown in Fig. —5—.

In the embodiment shown in Fig. —1— the wheel of my invention has a hub sleeve 1 rotatably mounted upon the shaft 2 and held thereon by nuts 3' threaded to one end of the said shaft. Upon the exterior of the hub sleeve 1, I position hub flanges 3 and 4, connected to the said sleeve by right-hand and left-hand threads, respectively. Each of these hub flanges has an inner sleeve portion 5 having a pair of diametrically opposite key-seats or slots 6 therein, the said slots being adapted to interfit with inwardly directed splines 7 upon a split sleeve 8 mounted upon the said sleeve portion 5 centrally of the hub. Being thus nonrotatably interengaged with the sleeve 8, a rotation of this sleeve with respect to the hub sleeve 1 will cause hub members 3 and 4 to rotate with the same; thereby moving these latter members endwardly relative to each other, owing to the difference in direction of the right-hand and left-hand threads by which they are mounted upon the hub sleeve 1. Consequently, by rotating the adjusting sleeve 8 in the proper direction, the hub flanges 3 and 4 may be approached toward each other until the shoulders upon the sleeves connected thereto abut against the ends 10 of the said adjusting sleeve.

For the peripheral member of my wheel, I provide a metal rim 11 having opposed inwardly facing annular flanges 12 adapted to engage lateral projections 13 on a cushioning tire 14, this method of securing the tire being well-known to those familiar with wheel constructions. Radially inward of the said opposed flanges I equip the rim member 11 with annular grooved formations 15 adjacent to the lateral edges of the said rim member and facing laterally outward of the wheel, these outward formations having a plurality of substantially radial slots 16 at intervals on the same. Likewise, I provide a plurality of substantially radial slots in the flanges 3 and 4 of the hub, these slots upon both the hub and rim members being slightly greater in width than the thickness of the spokes 17 and 18 connecting the said hub and rim members when the wheel is assembled. The laterally disposed spokes 17 of the wheel are preferably made in pairs, as shown in Fig. —1—, with the inner ends connected in the form of a flattened loop, each pair being formed of a single strip of steel. Adjacent to the doubled or looped inner end of the said sectionally V-shaped pair of spokes and to each of the outer ends of the same, each spoke is provided with an elongated slot 19, which slot is adapted to have a locking member or key 20 slipped entirely through the same. The locking member 20 has its width in a direction radial of the wheel reduced by a slot 21 at or near its longitudinal center, thereby providing a recess slightly greater in width than the thickness of the spoke and permitting the end of the spoke to be drawn into the said recess when the spoke is moved in a direction radial of the wheel with reference to the said locking member.

To provide for a transverse rigidity of the wheel, I alternate the said bifurcated or twin spoke formations with spokes formed singly, the latter connecting each of the hub flanges with the laterally opposite portion of the rim. When the wheel is to be assembled, the hub flanges 3 and 4 are approached toward each other as far as possible by rotating the adjusting member 10 relative to the hub, thereby lessening the distances between the points normally connected by the ends of each spoke. The spokes together with the locking members positioned in the slots thereof are then slipped through the slots 16 and 22 into the respective anchoring formations of the rim and of the hub, whereupon the adjusting member 10 is rotated in the direction in which it causes the hub flanges 3 and 4 to move laterally away from each other, thereby tightening all of the spokes simultaneously.

While I preferably use twin or duplex spoke formations as shown in Fig. —1—, thereby reducing the number of slots in the hub member of the wheel and consequently reducing the extent to which the flanges of this hub are weakened by the slots, I do not wish to be limited to this particular arrangement. Instead, the hub and rim members may be provided with an equal number of slots or independent anchoring formations for the spokes, as shown in Fig. —5—. Likewise, the spokes may be made of round bars having elongated heads formed integral therewith, as shown in Fig. —5—, and other details of the wheel construction may be modified in many ways without departing from the spirit of my invention.

I claim as my invention:

1. A wheel including a tubular member equipped upon its respective end portions with right and left-hand threads, a pair of spoke-carrying members threaded respectively upon the said portions of the tubular member and presenting tubular extensions toward each other and an actuating member carried by the tubular member and non-rotatably engaging the said extensions of the spoke-carrying members, the said engagement enabling the actuating member upon rotation thereof with respect to the said tubular member to rotate the spoke-carrying members in unison with each other.

2. A hub for vehicle wheels comprising a tube shaft and equipped at its respective ends with reverse threads, a pair of spoke-carrying members threaded respectively upon the said ends of the tube, said members equipped at their inner ends with key ways; and a sleeve mounted upon the said tube intermediate of the said members and equipped with key formations engaging the said keyways upon both of the latter, the said engagement enabling a rotating of the sleeve upon the tube to rotate said members in unison so as simultaneously to tighten the spokes upon both sides of the wheel.

3. A hub for vehicle wheels comprising a tube equipped at its respective ends with reverse threads, and with a cylindrical portion intermediate of the said threads, a pair of spoke-carrying members threaded respectively upon the said ends of the tube, and a sleeve mounted upon the cylindrical portion of the tube, the said sleeve and members equipped with coöperating formations to prevent relative rotation thereof about the axis of the said shaft, the said reverse threads coöperating with said formations to cause a separation of said members upon the rotating of the sleeve upon the tube.

4. A hub for vehicle wheels comprising a sleeve provided at respective ends with right-hand and left-hand screw-threads, a pair of spoke-carrying rings threaded respectively, upon the said threaded ends, and means arranged between said rings adapted to prevent relative rotation thereof and causing them to rotate in unison for tightening or loosening the spokes.

5. A hub for vehicle wheels comprising a sleeve provided at respective ends with right-hand and left-hand screw-threads, a pair of spoke-carrying rings threaded respectively, upon the said threaded ends, and means arranged between said rings adapted to prevent relative rotation thereof and causing them to rotate in unison for tightening or loosening the spokes, and means for locking one of said rings against rotation and thereby preventing rotation of the other ring.

In testimony whereof I have signed my name in presence of two subscribing witnesses.

FRANKLIN A. FROMMANN.

Witnesses:
M. M. BOYLE,
ALBERT SCHEIBLE.